3,396,536
HYDRAULIC TRANSMISSION
Wendell E. Miller, Norman L. Walter, and Richard K. Tessmann, Hutchinson, Kans., assignors to The Cessna Aircraft Company, Wichita, Kans., a corporation of Kansas
Filed Aug. 8, 1966, Ser. No. 581,126
11 Claims. (Cl. 60—53)

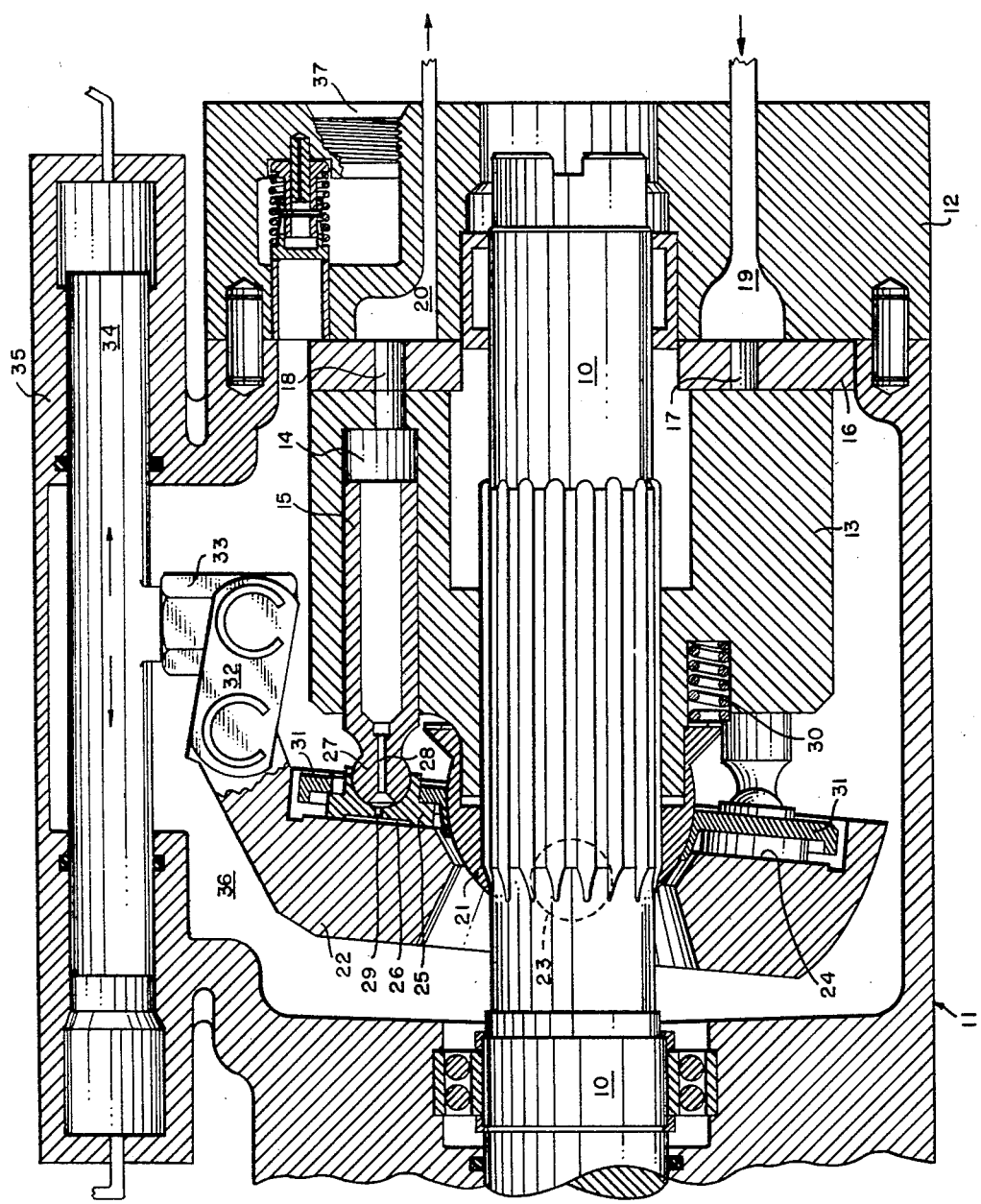

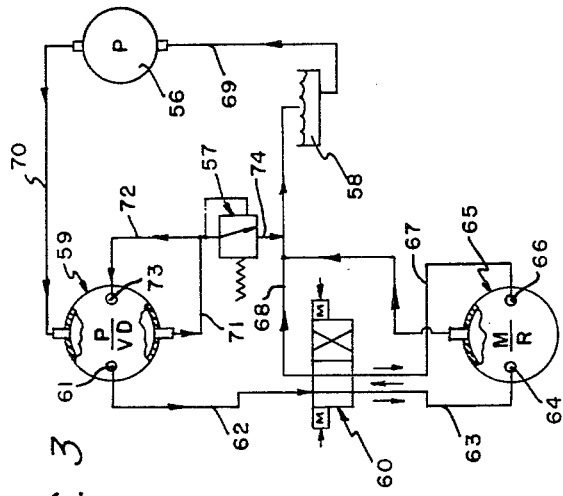
FIG. 3
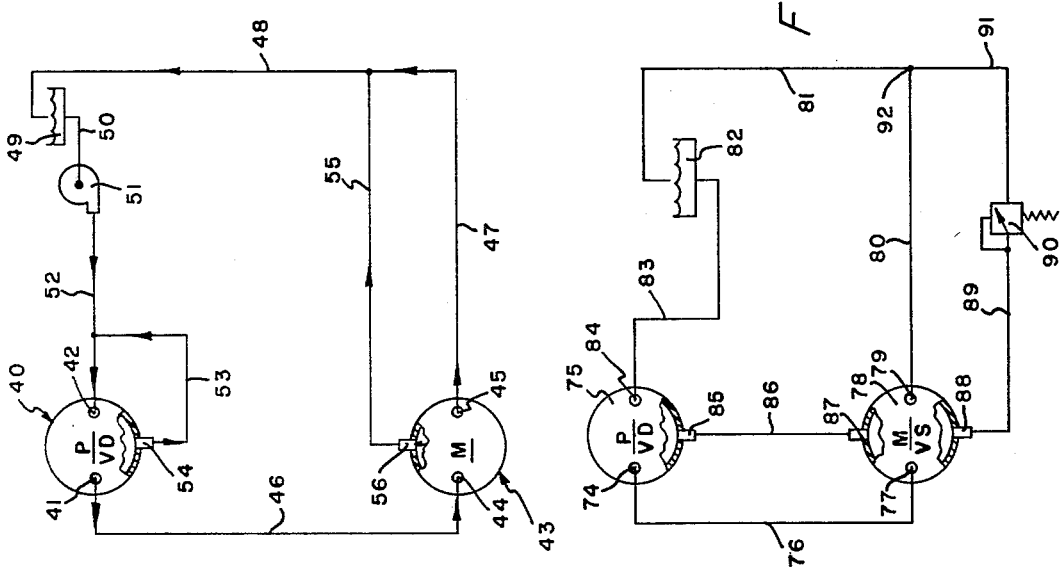
FIG. 2
FIG. 4
WENDELL E. MILLER
NORMAN L. WALKER
RICHARD K. TESSMANN
INVENTOR.
BY
ATTORNEY

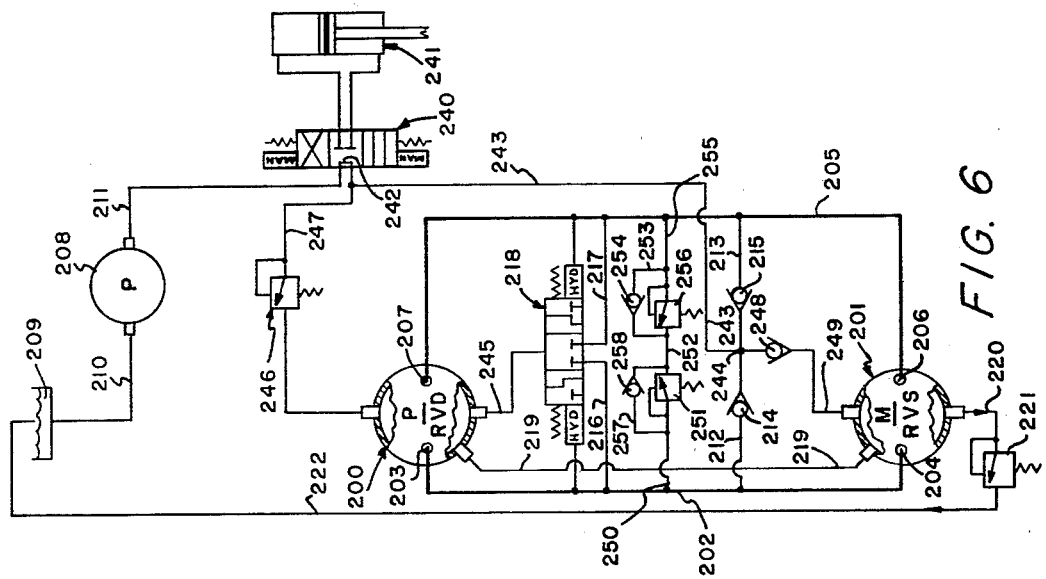
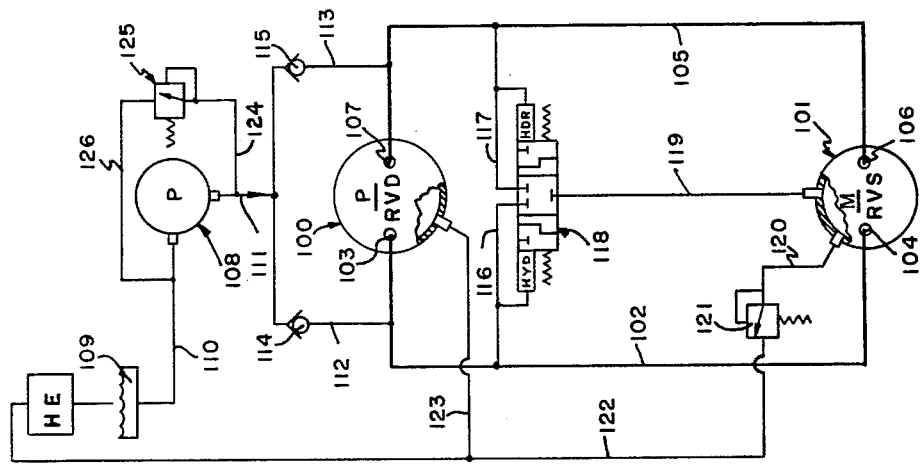

ABSTRACT OF THE DISCLOSURE

Hydraulic system components for assuring adequate lubrication of the moving parts of housing enclosed pumps and motors in the system by delivering hydraulic fluid directly into the interiors of the housings, and by restricting outflow of fluid from the housings to maintain them full of fluid during system operation.

---

This invention relates to hydraulic energy transmission systems which include at least one power driven energy translating device, such as a hydraulic pump, which converts mechanical energy to hydraulic energy, and one or more fluid receiving energy translating devices, such as hydraulic motors, which receive and convert hydraulic energy to mechanical energy.

More particularly, this invention relates to improved circuitry for such hydraulic transmissions to provide positive pressure lubrication for the excessive wear parts of one or all of the energy translating devices which constitute components of the respective systems.

For efficiency and adequate pressure and volume handling of hydraulic fluid, conventional hydraulic energy transmissions normally include a multi-piston, variable volume, swash plate type hydraulic pump, and often one or more hydraulic motors of the same type, as energy translating devices.

In such energy translating devices, the several pistons reciprocate respectively in longitudinally disposed cylinders arranged radially about and parallel to the longitudinal and rotational axis of a cylinder block which is fixed on a shaft which is journaled in a housing. The exposed ends of the respective pistons are fitted with wear shoes which are urged into substantially continuous contact with the planar surface of a tiltable swash plate or cam plate, as the cylinder block rotates. The swash plate is tiltable about an axis transverse to the shaft rotational axis. The variable canting of the swash plate surface varies the length of stroke of the various pistons, and hence the volume of operating fluid handled by each cylinder during each stroke cycle of each piston. The swash plate tilt or cant angle can usually be varied between a zero piston fluid handling angle in which the piston shoe contacting surface of the plate is normal to the rotational axis of the cylinder block, and a position of maximum piston fluid handling, or maximum piston stroke.

Since the piston wear shoes are urged into frictional contact with the swash plate surface, these contacting surfaces present an extremely difficult to solve wear problem. Adequate lubrication of the clearance space between the respective piston shoe surfaces and the contacted swash plate surface has proven almost impossible.

Initially, leakage of hydraulic fluid from high pressure chambers in the pump or motor into the housing which encloses the mentioned working parts, was depended upon for shoe and swash plate lubrication. This proved entirely inadequate.

Next, very small ducts were provided in the wear shoe fitted ends of the pistons to conduct hydraulic fluid under operating pressure directly from the piston cylinders onto the wear shoes. Naturally a drain was provided for the fluid which accumulated in the housing. This arrangement also provided inadequate lubrication for the piston wear shoes and swash plate, presumably because the fluid drained out of the housing as fast as it entered.

More recently, the level of the housing fluid drain outlet was raised in an attempt to continuously maintain a greater volume of hydraulic fluid in the housing. Lubrication was still inadequate because the level of hydraulic fluid in the housing could not be maintained as high as the level of the drain outlet, because the fluid still drained out of the housing as fast as it entered through the lubrication ducts.

Through tests we have discovered that the rapid rotation of the cylinder block, of the exposed portions of the pistons, and of the piston wear shoes causes the relatively small permitted accumulation of lubricating fluid in the housing to swirl about the interior wall surface of the housing and to completely cover that surface with a generally cylindrical layer of fluid an inch or so thick. Thus, centrifugal force causes the liquid which covers the drain outlet to move outward rapidly through the drain. This explains why the accumulation of liquid in the housing is relatively small—why the liquid drains out as fast as it enters the housing after a certain volume has accumulated.

We have also discovered that the swirling of the accumulated hydraulic fluid in the housing creates a central core of air or vapor in the housing. The piston shoes thus operate in an air pocket rather than in an oil bath. As a result, centrifugal force causes lubricant to be thrown outward from the clearance space between the piston shoe surfaces and the swash plate surface, thus voiding that clearance space of hydraulic lubricating fluid as fast as the fluid enters the space, whether the oil is supplied by leakage paths or by lubricant ducts.

The primary object of this invention, therefore, is to provide hydraulic energy transmission systems of various types which will obviate the above explained difficulties and past failure to adequately lubricate the excessive wear surfaces of the energy translating components of such systems.

More specifically it is an object of this invention to provide hydraulic energy transmission systems in which one or more components thereof alternatively or cooperatively provide a back pressure against the escape of lubricating hydraulic fluid from the housings of one or more energy translating devices in the system, thereby maintaining the particular housing or housings completely full of lubricating fluid at all times, and thereby eliminating the tendency of centrifugal force to throw lubricating fluid from the clearance space between excessive wear parts.

It is a further object to provide hydraulic transmissions in which one or more component parts thereof pressurize and maintain the housings of selected energy translating devices completely full to provide continuous positive lubrication of the internal parts thereof, even during periods when the main pump of the system is adjusted to a zero fluid delivery condition.

Still another object is to provide a hydraulic transmission in which the housings of one or more energy translating devices are maintained completely full during operation of the system, and in which excess fluid which accumulates within the housing or housings is regenerated back into the hydraulic circuit.

Another object is to provide a system of the type mentioned in which hydraulic fluid being circulated through the system is conducted into and out of the housings of one or more component energy translating devices while the fluid within the housings is maintained under a back pressure to keep the housings full, while permitting such a rate of flow as to flush and clean the housings, while the housings simultaneously serve as heat exchangers to partially cool the fluid flowing through them. By maintaining the fluid in the housings under a back pressure to maintain them completely full, the formation of a central core air pocket is prevented and the wear parts of the devices are continuously submerged in an oil bath, regardless of the centrifugal force acting on the fluid.

The invention will be more clearly understood when the following description is read in connection with the accompanying drawings in which:

FIG. 1 is a central longitudinal sectional view through a reversible, multi-piston, variable volume, swash plate type hydraulic energy translating device, which may be operated either as a pump or a motor, and which illustrates the type of hydraulic transmission component discussed above;

FIG. 2 is a schematic diagram of an open circuit hydraulic transmission including a main pump and one motor, and in which pressurization of the pump housing to maintain it completely full is accomplished by a system charging pump of the centrifugal type;

FIG. 3 is a schematic diagram of a different type open circuit transmission in which pressurization of the pump housing to maintain it completely full is accomplished by the cooperative action of a positive displacement charging pump and a low pressure relief valve to accommodate excess flow delivered by the charging pump;

FIG. 4 is a schematic diagram of an open circuit hydraulic transmission without charging provisions, and in which the lubricating liquid which accumulates in the housings of both the pump and of the motor is pressurized by a low pressure relief valve which maintains a back pressure on the housing interiors;

FIG. 5 is a schematic drawing of a reversible flow closed loop hydraulic transmission system in which pressurization of the motor housing is accomplished by the cooperative action of a charging pump and an excess charging fluid relief valve, regardless of the direction of fluid flow through the closed loop hydraulic circuit; and FIG. 6 is a schematic drawing of a different type of reversible flow closed loop transmission in which the interiors of both the pump and motor housings are not only continuously pressurized and maintained full, but are also continuously flushed and cooled by the flow through of excess charging fluid from a charging pump, even during periods when the main pump is operating under a condition of zero fluid intake and delivery.

For the purposes of this description, the various hydraulic energy translating devices shown schematically as pumps and motors in drawings FIGS. 2 to 6 inclusive shall be considered to be of the same general type as shown in FIG. 1, although it should be understood that the invention described herein is not limited in its application to any specific type of hydraulic transmission.

It is a common characteristic of all hydraulic transmission systems illustrated that whatever system components serve as a means for maintaining the interiors of the various housings pressurized to maintain them completely full of lubricating fluid, such means is in communication with a drain or fluid escape port of the housing or housings, and is also in communication with conduit means for conducting fluid from the interior of the housing back into the hydraulic circuit for re-use and recirculation by the hydraulic energy translating devices included in the transmission.

FIG. 1 illustrates a reversible, variable displacement, axial piston, swash plate type hydraulic pump. A motor of this type would be identical in construction.

A central shaft 10 is journaled at spaced points in a housing 11, which has a fixed end plate 12. A cylinder block 13 is slidably splined on shaft 10, and is provided with a plurality of angularly spaced longitudinally disposed cylinders 14, which respectively receive reciprocating hollow pistons 15.

A stationary valve plate 16 is sandwiched between the mating inner surface of end plate 12 and the adjacent surface of cylinder block 13. Valve plate 16 is provided with arcuate intake ports 17 and discharge ports 18, which are arranged concentrically around shaft 10 to register alternately with the cylinders 14 as the block 13 rotates with shaft 10. Each intake port 17 is in communication with a fluid inlet duct 19, and each discharge port 18 communicates with an end plate fluid exhaust duct 20.

The opposite end of cylinder block 13 has an integral cylindrical reduced portion on which is mounted a semi-spherical shaped bearing member 21, which has limited longitudinal movement with relation to the cylinder block 13, and which is slidably splined on shaft 10 to rotate therewith.

Surrounding shaft 10, and located adjacent the end of bearing member 21, is an annular swash or cam plate 22, mounted on a fixed transverse tilting axis, the relative location of which is indicated by the broken line circle 23. Plate 22 has a planar ground annular surface 24 on which planar ground piston wear shoes 25 slide as the cylinder block rotates.

As clearly shown in FIG. 1 the plate contacting surfaces of wear shoes 25 are provided with central recesses 26 which serve as pressure balancing reservoirs to reduce wear on the contacting surfaces of the shoes and swash plate 22.

The opposite ends of wear shoes 25 are connected by a ball joint 27 to the respective outer ends of pistons 15. Minute orifice ducts 28 in the ball ends of the pistons register with central ports 29 in each wear shoe, and serve to conduct minute quantities of high pressure hydraulic oil from the cylinders 14 into pressure balancing reservoirs 26 during the pressure stroke of each piston, whether the described device is acting as a pump or as a motor.

As a means of maintaining continuous frictional contact of the planar ground surface of cylinder block 13 against the similarly ground contacted surface of valve plate 16, and of simultaneously maintaining contact between the wear shoe surfaces and the contacted swash plate surface, a plurality of angularly spaced compressed coil springs 30 are seated in blind bores in the cylinder block 13 and are arranged in a concentric circular pattern about shaft 10. One end of each spring bears against block 13 and their opposite ends bear against bearing member 21. Longitudinally slidable bearing 21 seats in a complemental central seat in an annular, floating shoe contacting spider 31, as shown. Spring thrust is thus transmitted in opposed directions to both the cylinder block and the piston wear shoes, regardless of the tilt angle of swash plate 22.

The tilt angle of plate 22 with respect to the rotational axis of the described rotating assembly is adjusted by a link 32 which is pivotally connected at its opposite ends to swash plate 22 and to a cross arm 33 which is integral with the piston 34 of a conventional hydraulic servo cylinder 35.

To those familiar with this art it will be understood that changing the tilt angle of plate 22 varies the length of stroke of pistons 15, and hence their displacement. Adjusting swash plate surface 24 to lie in a plane normal to the rotational axis of shaft 10 provides zero intake and zero discharge for cylinders 14, even though the cylinder block and its shaft continue to be rotated. Moving plate 22 to an opposite tilt angle from the angle shown causes a reversal of fluid flow through ducts 19 and 20.

It will also be understood that during operation of the described pump (or motor) some leakage of high pressure fluid will occur between the contacting surfaces of cylinder block 13 and valve plate 16, and between the exterior surfaces of the pistons 15 and the contacting walls of the cylinders 14. Hydraulic fluid will thus accumulate in the sealed housing cavity 36, regardless of whether or not the orifice ducts 28 and 29 are provided for direct lubrication of the wear surfaces of shoes 25. Since the housing is not intended to withstand the high fluid pressure produced in cylinders 14, a fluid escape port 37 is provided for housing cavity 36, through which accumulated fluid may be delivered back into the low pressure side of the hydraulic system.

When the above described hydraulic energy translating device is used as a pump, its shaft 10 is power rotated by suitable connection to a power plant, not shown. When used as a motor its cylinders receive fluid under pressure from a pump, and the resultant reciprocation of the pistons causes rotation of cylinder block 13 and shaft 10.

Referring now to the various hydraulic transmissions illustrated in the drawing, the lettered symbol $$\frac{P}{VD}$$

indicates a variable displacement pump $$\frac{M}{VS}$$

indicates a variable speed motor $$\frac{M}{R}$$

indicates a reversible motor $$\frac{P}{RVD}$$

indicates a reversible variable displacement pump, and $$\frac{M}{RVS}$$

indicates a reversible variable speed motor. All are of the general type illustrated in FIG. 1.

Each of the hydraulic transmission systems shown schematically in drawing FIGS. 2 to 6 inclusive, includes:

A pair of cooperating hydraulic energy translating devices in the form of (a) a variable displacement type main pump having a pair of ports, and (b) a fluid driven motor having a pair of ports. Each of said devices is enclosed in a hydraulic system fed housing, as described in connection with FIG. 1;

A means which defines a circuit including a high pressure passage affording flow from one pump port to one motor port, and a low pressure passage affording flow from the other motor port to the other pump port;

A housing pressure control passage which affords egress of accumulated fluid from the interior of at least one of said energy translating devices;

And means in communication with said housing pressure control passage and with the said low pressure passage for maintaining a back pressure against the fluid flowing from the interior of the said one housing through the housing pressure control passage into the low pressure passage of the circuit.

In the following description, a distinction will be maintained between motor and pump ports and ports which merely lead to or from the interior of the housing which encloses a motor or pump by referring to the latter as "housing" ports.

*Operation.—FIG. 2*

The FIG. 2 transmission includes a main pump 40 having a pair of ports 41 and 42, and a motor 43 having a pair of ports 44 and 45.

When the pump shaft is power rotated fluid is forced under pressure from pump exhaust port 41 through a hydraulic circuit which includes a high pressure passage in the form of a conduit 46 to motor intake port 44. From motor exhaust port 45 fluid flow continues through a low pressure passage of the circuit which includes conduits 47 and 48, a system reservoir 49, a conduit 50 to a driven centrifugal type system charging pump 51, and a conduit 52 from the charging pump exhaust to the main pump intake port 42, where the fluid begins its recirculation through the circuit.

Charging pump 51 is capable of delivering a larger volume of fluid to the main pump intake than the main pump is capable of accepting even when operating at maximum practical speed. A relatively low pressure is thus continuously maintained in conduit 52. Since the charging pump in this transmission is of the centrifugal type, no provision for by-passing excess fluid to the reservoir is necessary.

In the FIG. 2 transmission only the pump 40 is lubricated in accordance with our invention. A housing pressure control passage consists of a conduit 53 which connects a housing fluid escape port 54 to the charging pump pressurized conduit 52. The charging pump 51 thus serves as a means in communication with the housing pressure control passage and with the low pressure passage of the hydraulic circuit for maintaining a back pressure against accumulated fluid flowing from the interior of the housing to the low pressure passage of the hydraulic circuit.

Since the back pressure in line 53 maintains the interior of the housing of pump 40 completely full of hydraulic fluid at all times during operation of the transmission, the housing enclosed working parts of pump 40 are always adequately lubricated, which is a primary object of this invention.

The hydraulic fluid which accumulates in the housing of motor 43 is disposed of through a conduit 55 which connects a housing fluid escape port 56 with the low pressure passage of the hydraulic circuit at conduit 48. Those familiar with this art will recognize that it would be a relatively simple matter to eliminate conduit 55 and to connect housing port 56 to housing pressure control conduit 53, in which case charging pump 51 would maintain a back pressure on the accumulated fluid flowing from the housings of both the pump 40 and the motor 43. Both would thus be adequately lubricated at all times.

*Operation.—FIG. 3*

The hydraulic transmission of FIG. 3 differs primarily from the FIG. 2 transmission by the substitution of a positive displacement type charging pump 56, by the inclusion of a low pressure relief valve 57 to by-pass excess charging pump delivery to the reservoir 58, by the inclusion of a motor reversing valve 60 capable of selectively directing pressurized fluid from the main pump 59 to either of the two ports 64 and 66 of the reversible motor 65, and by including the interior of the housing of main pump 59 as a part of the low pressure passage of the hydraulic circuit.

With the reversing valve 60 in the position shown, and with the shaft of main pump 59 being power rotated, pressurized fluid is forced from pump exhaust port 61 through the high pressure passage of the hydraulic circuit, which consists of conduits 62 and 63, into a port 64 of a reversible motor 65, thence out motor port 66 through the low pressure passage of the circuit, which consists of the conduits 67 and 68, the reservoir 58, conduit 69, charging pump 56, conduit 70, the interior of the housing of main pump 59, a housing pressure control passage 71, and a connected conduit 72, into the main pump inlet port 73.

The inlet port of relief valve 57 is connected to both the conduits 71 and 72. The relief valve outlet is connected by a conduit 74 to a portion of the low pressure passage of the circuit-conduit 68.

As is common in all pre-charged hydraulic transmission circuits, charging pump 56 is capable of delivering a greater volume of fluid through the pump housing to pump intake port 73 than is accepted by the main pump. The excess fluid is bypassed through low pressure relief valve 57 into the low pressure passage of the circuit, and is returned to the reservoir 58 through conduit 68.

In the FIG. 3 transmission, relief valve 57 serves a function other than the mere by-passing of fluid to reservoir. It cooperates with charging pump 56 to maintain a predetermined low pressure in housing pressure control passage 71, and thus maintains the interior of the main pump housing completely full of hydraulic fluid to provide adequate lubrication for the pump working parts at all times during operation of the transmission.

In the FIG. 3 transmission, then, the charging pump 56 and relief valve 57 together constitute a means in communication with housing pressure control passage 71 and with the low pressure passage (68 and 69) of the hydraulic circuit for maintaining a back pressure against accumulated fluid flowing from the housing.

The operation is the same when reversing valve 60 is shifted to the left, except that conduit 67 then becomes a part of the high pressure passage leading from pump port 61 to motor port 66, and conduit 63 then becomes a part of the low pressure passage leading from motor port 64 to reservoir 58.

*Operation.—FIG. 4*

The hydraulic circuit of the FIG. 4 transmission does not include a charging pump.

Fluid under high pressure flows from the exhaust port 74 of main pump 75 through a high pressure passage of the circuit, a conduit 76, to the intake port 77 of a motor 78, thence from motor exhaust port 79 through a low pressure passage of the circuit consisting of conduits 80 and 81, a reservoir 82, and a conduit 83 to pump intake port 84.

A housing pressure control passage for both the pump and motor housings is provided by a pump housing port 85, a connected conduit 86, motor housing ports 87 and 88, and a conduit 89 leading from the interior of the housing of motor 78 to the inlet port of a low pressure exhaust valve 90. A conduit 91 connects the outlet port of exhaust valve 90 to the low pressure passage of the hydraulic circuit at a junction 92.

Fluid which accumulates in the housings of both the pump 75 and the motor 78 can travel to reservoir only through the specified housing pressure control passage and through the low pressure relief valve 90.

In the FIG. 4 transmission, then, relief valve 90 constitutes the sole means in communication with the previously designated housing pressure control passage, and with the low pressure passage of the hydraulic circuit for maintaining a back pressure against accumulated fluid flowing from both housings, to thus maintain the housing interiors full of fluid at all times to provide adequate lubrication for the working parts of both the pump and the motor.

*Description.—FIG. 5*

As embodied in the FIG. 5 transmission, our invention provides continuous and positive lubrication for the working parts of the motor only.

The hydraulic circuits shown in the FIG. 2, 3 and 4 transmissions are commonly called open loop circuits because the circulating fluid passes from the motor exhaust port to the reservoir before it again reaches the main pump intake port.

The hydraulic circuit utilized in the FIG. 5 transmission is of a different type, and is commonly called a reversible closed loop circuit because fluid exhausted from the motor travels directly to the main pump intake port rather than to the reservoir, and because fluid may be selectively exhausted from the reversible flow main pump into either side of the closed loop circuit to effect motor reversal.

As in all the transmisisons illustrated, the FIG. 5 transmission includes a main pump 100 and a motor 101. A conduit 102 connects one main pump port 103 with one motor port 104. A conduit 105 connects the other motor port 106 with the other pump port 107, to complete the loop circuit. As indicated by symbol, both the pump and the motor are reversible.

*Operation.—FIGURE 5*

Assuming that the swash plate of main pump 100 is adjusted so that the pump exhausts through port 103, conduit 102 becomes the high pressure passage of the loop circuit, and fluid is delivered through that passage to motor port 104. Conduit 105 becomes the low pressure passage of the loop circuit, and fluid flows from motor port 106 through that passage back to pump port 107.

Inherent leakage and lubricating losses from this closed loop circuit are replaced by a charging pump 108, which delivers a greater volume of fluid into the low pressure passage of the circuit than the main pump can accept, regardless of which of the conduits, 102 or 105, is at the time operating as the low pressure passage of the loop circuit.

The excess volume of fluid delivered into the low pressure side of the loop circuit must be disposed of, but must be retained in the hydraulic system.

To accomplish this, fluid flows through an auxiliary circuit which includes a system reservoir 109, conduit 110 to charging pump 108, from the pump through conduit 111 to intercommunicating branch conduits 112 and 113, which are connected respectively to the conduits 102 and 105 of the closed loop circuit.

Check valves 114 and 115 are interposed in conduits 112 and 113, respectively, between the charging pump 108 and each of the conduits 102 and 105 of the loop circuit. If conduit 102 is serving as the high pressure passage of the loop, then the high pressure in that conduit is exerted against check valve 114 to hold it closed, and fluid delivered by the charging pump 108 travels through conduit 113 and through check valve 115 to the low pressure passage of the loop, conduit 105. If conduit 105 is the high pressure passage, then check valve 115 is held closed by fluid pressure and the charging pump delivers through check valve 114 and conduit 112 into the low pressure passage, conduit 102.

Since the volume of fluid delivered by the charging pump 108 into the low pressure passage of the loop is far in excess of the volume which is accepted by the intake of main pump 100, the excess fluid is disposed of by flowing through the remainder of the above mentioned auxiliary circuit. In addition to the conduits and other components above identified, the auxiliary circuit includes conduits 116 and 117, a hydraulic pressure actuator shuttle valve 118, conduit 119, the interior of the housing of motor 101, a housing pressure control passage 120, a low pressure relief valve 121, and a conduit 122 which carries the excess fluid back to reservoir 109 for recirculation.

As will be known to those familiar with this art, shuttle valve 118 operates in response to the higher pressure in the high pressure passage of the loop circuit to connect the low pressure passage of the loop circuit with auxiliary circuit conduit 119.

Because of the forced flow of excess fluid from the low pressure passage of the loop circuit through the interior of the housing of motor 101 against the back pressure created by relief valve 121, the motor housing is not only maintained completely full of fluid at all times during operation of the main pump, but the motor housing also serves to help cool the hydraulic fluid flowing through it. In addition, the volume of fluid flowing through the motor housing serves to continuously flush the housing.

In the FIG. 5 transmission, then, the charging pump 108 with its excess fluid delivery, and relief valve 121 and the connections between them constitute a means in communication with the housing pressure control passage and in communication with the low pressure passage of the loop circuit for maintaining a back pressure against fluid flowing from the interior of the motor housing through the housing pressure control passage and back to the low pressure passage of the loop circuit through the identified auxiliary circuit. The motor housing is thus maintained completely full of fluid to provide adequate lubrication for the working parts of the motor, which is a primary purpose of the invention.

As for leakage and drainage from lubricant ducts which accumulates in the interior of the main pump housing, it is disposed of through a conduit 123 which is connected to auxiliary circuit conduit 122.

As will be understood by those familiar with this art, when shuttle valve 118 is shifted by differential pressure in the two conduits 102 and 105 of the loop circuit to either the right or left of its neutral position, as shown in FIG. 5, there is a momentary blockage of fluid flow through this valve and through the auxiliary circuit. To protect both the auxiliary circuit and the charging pump 108 against excessive pressure surges during such momentary flow blockage by the shuttle valve, a conduit 124 is connected to charging pump delivery conduit 111 and to the inlet of a protective relief valve 125. The relief valve outlet is connected by a conduit 126 to the charging pump inlet conduit 110. Relief valve 125 is set to remain closed so long as normal operating pressure exists in the low pressure passage of the loop circuit and in the auxiliary circuit.

*Description.—FIG. 6*

The transmission illustrated in FIG. 6 also embodies a reversible closed loop circuit, and is very similar to the described FIG. 5 transmission. The primary differences between the two are that the auxiliary circuit of the FIG. 6 transmission includes the interiors of the housings of *both* the main pump and the motor, regardless of which side of the loop circuit is acting as the high pressure passage, and by provision of a flow through manually operated control valve 240 interposed in the auxiliary circuit, by means of which pressurized fluid delivered by the charging pump may selectively be used temporarily to operate a separate hydraulically actuated device or system 241, while continuing to maintain adequate fluid pressure in the low pressure passage of the loop circuit.

*Operation.—FIG. 6*

Fluid flows through the auxiliary circuit from reservoir 209 through conduit 210 to charging pump 208. Discharged fluid from pump 208 flows through conduit 211, through a neutral loop passage 242 in flow control valve 240, through connected conduit 243 to a junction 244 with branch conduits 212 and 213, having respectively interposed check valves 214 and 215. Fluid flows from junction 244 to the low pressure passage of the loop circuit, and thence to the intake port of the main pump 200.

In FIG. 6 the motor is designated by numeral 201, and the loop circuit is made up of conduits 202 and 205. Conduit 202 connects one pump port 203 with one motor port 204. Conduit 205 connects the other motor port 206 with the other pump port 207.

Continuing with the explanation of flow through the auxiliary circuit, and assuming conduit 205 to be serving as the low pressure passage of the loop circuit, excess fluid from the charging pump flows from the low pressure passage 205 through conduit 217, differential pressure actuated shuttle valve 218, conduit 245, through the interior of the housing of pump 200, through conduit 219, through the interior of the housing of motor 201, through housing pressure control passage 220, through interposed low pressure relief valve 221, and through conduit 222 back to the reservoir 209.

If conduit 202 is acting as the low pressure passage of the primary loop circuit, then the flow of excess fluid to shuttle valve 218 will be through conduit 216 rather than through conduit 217, but the flow will otherwise be as described.

In the FIG. 6 transmission then, the charging pump 208 with its excess fluid delivery, and low pressure relief valve 221 and the connections between them, constitute a means in communication with the housing pressure control passage 220, and in communication with the low pressure passage of the loop circuit, for maintaining a back pressure against fluid flowing from the interior of both pump and motor housings through the housing pressure control passage and back to the low pressure passage of the loop circuit through the identified auxiliary circuit, for maintaining the housings of both the pump and the motor completely full of fluid to provide adequate lubrication for the working parts of both pump and motor.

As in the FIG. 5 transmission, the FIG. 6 transmission includes a means for protecting the auxiliary circuit and the charging pump against excessively high pressure surges due to momentary blockage of flow through the auxiliary circuit by the shifting of shuttle 218. This means includes a charging pump protective relief valve 246 interposed in a conduit 247, which connects conduit 243 to the interior of the housing of main pump 200, as shown. Thus when the shuttle valve 218 is momentarily closed fluid is by-passed around the shuttle valve and back into the auxiliary circuit on the other side of that valve.

As an additional protection to the described hydraulic transmission system, in case of temporary faulty operation or failure of the charging pump 208, with consequent failure to replace fluid which is continuously lost from the loop circuit by leakage and through pump and motor lubrication ducts, a check valve 248 is interposed in a conduit 249 which connects the interior of the housing of motor 201 with the junction 244 of conduits 212, 213 and 243.

Fluid which is lost from the loop circuit and which accumulates in the housings of both the pump 200 and motor 201 may thus pass through conduit 249, check valve 248, through either of the check valves 214 or 215, to whichever of the conduits 202 or 205 is at the time serving as the low pressure passage of the loop circuit. Thus the losses from the loop circuit are replaced even though the charging pump temporarily fails.

As a still further protection to the described transmission, if conduit 202 is serving as the high pressure passage of the loop, excessively high pressure in that conduit is prevented by providing a cross over relief passage to the low pressure passage 205. Fluid flows from the excessive pressure conduit 202 through a conduit 250, through a high presure relief valve 251, a conduit 252, through a by-pass conduit 253 with interposed check valve 254, and through conduit 255 to low pressure passage 205.

If conduit 205 is serving as the high pressure passage of the loop circuit, fluid under excessive pressure flows from conduit 205 through conduit 255, through a high pressure relief valve 256, conduit 252, through a by-pass conduit 257 with interposed check valve 258, and through conduit 250 into low pressure passage 202.

Disposal of excess fluid which is delivered to the low pressure passage of the loop circuit has been described above.

Having described the several illustrated embodiments of the invention with sufficient clarity to enable those familiar with this art to construct and use them, we claim:

1. An hydraulic transmission comprising:
   a pair of cooperating hydraulic energy translating devices each being enclosed in an hydraulic system fed housing, said devices constituting
      (a) a variable displacement type main pump having a pair of ports; and
      (b) a fluid driven motor having a pair of ports;
   means defining a circuit including a high pressure passage affording flow from one pump port to one motor port, and a low pressure passage affording flow from the other motor port through a reservoir to the other pump port;
   a housing pressure control passage affording egress of accumulated fluid from the interior of the housing of at least one of said energy translating devices;
   and means in communication with said housing pressure control passage and with said low pressure passage for maintaining a back pressure against accumulated fluid flowing from the interior of said one housing through said housing pressure control passage into said low pressure passage, said means for maintaining a back pressure against fluid flowing from the interior of said housing including an auxiliary charging pump in communication with the low pressure passage of said circuit and delivering fluid under pressure to said main pump, the said housing pressure control passage being pressurized by the exhaust from said auxiliary pump.

2. The hydraulic transmission described in claim 1, and a reservoir interposed in the low pressure passage of said circuit.

3. The hydraulic transmission described in claim 1 in which the means for maintaining a back pressure against fluid flowing from the interior of said one housing includes a low pressure relief valve, having inlet and exhaust ports, and having its inlet port in communication with said housing pressure control passage and its exhaust port in communication with the low pressure passage of said circuit.

4. The hydraulic transmission described in claim 3, and means included in the low pressure passage of said circuit defining a passage affording communication between the inlet port of said relief valve and the inlet port of said main pump.

5. The hydraulic transmission described in claim 1 in which the interiors of the housings of both said energy translating devices are connected in series, and the housing pressure control passage of said one energy translating device affords egress of accumulated fluid from the housings of both said energy translating devices.

6. An hydraulic transmission comprising:
a pair of cooperating hydraulic energy translating devices each of which is enclosed in an hydraulic system fed housing, said devices constituting
(a) a variable displacement type main pump having a pair of ports; and
(b) a fluid driven motor having a pair of ports;
means defining a primary hydraulic circuit including a high pressure passage affording flow from one pump port to one motor port, and a low pressure passage affording flow from the other motor port to the other pump port;
a reservoir;
means defining an auxiliary circuit for conducting fluid from the low pressure passage of said primary circuit into the interior of the housing of at least one of said energy translating devices and thence to the reservoir, and from the reservoir back to the low pressure passage of said primary circuit;
a charging pump interposed in that portion of the auxiliary circuit between the reservoir and the low pressure passage of the primary circuit, and delivering fluid to said low pressure passage;
and fluid flow restricting means interposed in that portion of the auxiliary circuit between the housing of said one of said energy translating devices and the reservoir, for maintaining a back pressure on fluid in the interior of said housing to assure that the housing is kept filled to capacity.

7. The hydraulic transmission described in claim 6 in which the fluid flow restricting means is a low pressure relief valve.

8. The hydraulic transmission described in claim 6 in which that portion of the auxiliary circuit between the said low pressure passage and the fluid flow restricting means includes the interior of the housings of both of said hydraulic energy translating devices.

9. A hydraulic transmission comprising:
a pair of cooperating hydraulic energy translating devices each of which is enclosed in a hydraulic system fed housing, one of said devices being a reversible variable displacement primary pump having a pair of ports, and the other of said devices being a fluid drive motor having a pair of ports;
a pair of conduits each connecting one port of the pump with one port of the motor;
a reservoir;
an auxiliary charging pump;
means defining a first circuit leading from the reservoir to the charging pump inlet and from the charging pump outlet to each of the pair of conduits, the circuit including a check valve located between each of said pair of conduits and the charging pump outlet;
a shuttle valve having two inlet ports and one outlet port, the inlet ports being connected respectively to the two conduits, said shuttle valve being operable in response to the pressure differential between said pair of conduits for connecting the low pressure conduit to the shuttle valve outlet;
means defining a second circuit for conducting fluid from the shuttle valve outlet into the interior of the housing of at least one of said energy translating devices to lubricate moving elements therein, and thence to the reservoir; and
fluid flow restricting means interposed in that portion of the second circuit between the housing of said one of said energy translating devices and the reservoir for maintaining a back pressure on fluid flowing from the interior of the said housing to maintain it full to capacity, thus assuring lubrication of the working parts of the energy translating device therein.

10. The transmission described in claim 9 in which the fluid flow restricting means is a low pressure relief valve.

11. The transmission described in claim 9 in which the second circuit leads from the shuttle valve outlet through the interiors of the housings of both said energy translating devices and thence to the reservoir, and in which the fluid flow restricting means is located between the reservoir and the last of the housings to receive fluid from the shuttle valve outlet.

References Cited

UNITED STATES PATENTS

| 2,769,393 | 11/1956 | Cardillo et al. | 103—162 |
| 2,780,170 | 2/1957 | Stoyke et al. | 103—162 |
| 2,874,533 | 2/1959 | Schott | 60—53 |
| 3,089,426 | 5/1963 | Budzich | 103—162 |
| 3,108,544 | 10/1963 | Pesce | 103—162 |
| 3,230,699 | 1/1966 | Hann et al. | 60—53 |
| 3,291,067 | 12/1966 | North | 60—53 |

EDGAR W. GEOGHEGAN, *Primary Examiner.*